United States Patent [19]
Fauland et al.

[11] 3,929,763
[45] Dec. 30, 1975

[54] N(6)-DISUBSTITUTED ADENOSINE COMPOUNDS

[75] Inventors: Erich Fauland, Mannheim-Gartenstadt; Wolfgang Kampe, Heddesheim; Max Thiel, Mannheim; Harald Stork, Mannheim-Feudenheim; Felix Helmut Schmidt, Mannheim-Seckenheim, all of Germany

[73] Assignee: Boehringer Mannheim G.m.b.H., Mannheim, Germany

[22] Filed: May 30, 1974

[21] Appl. No.: 474,833

[30] Foreign Application Priority Data
July 31, 1973 Germany............ 2338705

[52] U.S. Cl............. 260/211.5 R; 424/180
[51] Int. Cl.² ........................... C07H 19/16
[58] Field of Search ............ 260/211.5 R

[56] References Cited
UNITED STATES PATENTS
3,551,409 12/1970 Kampe et al............ 260/211.5 R
3,706,728 12/1972 Fauland et al............ 260/211.5 R

*Primary Examiner*—Johnnie R. Brown
*Attorney, Agent, or Firm*—Burgess, Dinklage & Sprung

[57] ABSTRACT

Novel N(6)-disubstituted adenosine compounds of the formula

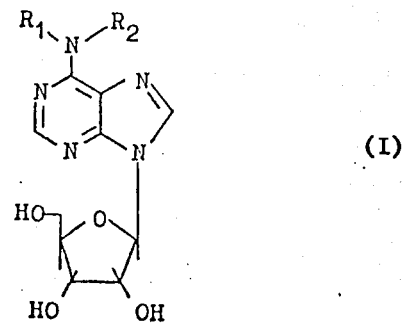

(I)

wherein
$R_1$ is a hydroxy- or alkoxy-substituted alkyl or a hydroxy- or alkoxy-substituted cycloalkyl radical; an
$R_2$ is an alkyl, cycloalkyl, alkyl-substituted cycloalkyl, bicycloalkyl or alkyl-substituted bicycloalkyl radical, or a pharmacologically compatible salt thereof, which exhibit antilipolytic, anti-hyperlipaemic and anti-hypercholesterolaemic action.

5 Claims, No Drawings

N(6)-DISUBSTITUTED ADENOSINE COMPOUNDS

The present invention is concerned with novel N(6)-disubstituted adenosine compounds, with therapeutic compositions containing them, and with therapeutic methods using such compounds.

The new N(6)-disubstituted adenosine compounds of the present invention are of the formula

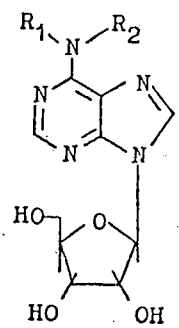

wherein
$R_1$ is a hydroxy- or alkoxy-substituted alkyl or a hydroxy- or alkoxy-substituted cycloalkyl radical; and
$R_2$ is an alkyl, cycloalkyl, alkyl-substituted cycloalkyl, bicycloalkyl or alkyl-substituted bicycloalkyl radical,
and the pharmacologically compatible salts thereof.

By the term "alkyl" we mean radicals containing about 1 to 8 carbon atoms. By the term "alkoxy" we mean radicals containing about 1 to 4 carbon atoms. The cycloalkyl and bicycloalkyl radicals preferably contain about 5 to 10 carbon atoms.

We have, surprisingly, found that the compounds of general formula (I) do not possess the cardiac and circulatory action usual for adenosine derivatives but have an anti-lipolytic, anti-hyperlipaemic and anti-hypercholesterolaemic action. The new compounds (I) according to the present invention bring about a considerable reduction of the concentration of free fatty acids, of triglycerides and of cholesterol in the serum. Furthermore, a slight reduction of the blood sugar level is also observed.

The new compounds according to the present invention can be prepared, for example, by reacting a purine riboside of the general formula:

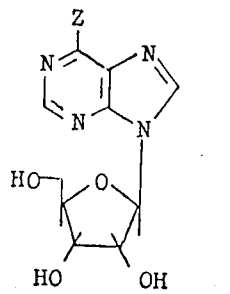

in which Z is a halogen atom, a reactive mercapto group or a trimethylsilyloxy radical, with an amine of the general formula:

$R_1 - NH - R_2$     (III)

in which $R_1$ and $R_2$ have the same meanings as above, wherein, if desired, the hydroxyl groups of the ribose residue are temporarily blocked by groups which can easily be split off, and the compounds (I) obtained are, if desired, subsequently converted into the corresponding salts with acids.

For carrying out the process according to the present invention, the purine ribosides (II) are reacted with the amines (III) in an inert solvent, for example, n-propanol, isopropanol, butanol, tetrahydrofuran or dioxane, preferably in the presence of a tertiary amine, for example triethylamine, at ambient temperature or at a slightly elevated temperature.

The purine ribosides (II) used as starting materials in which Z is a halogen atom, are described, for example, in Coll. Czech. Chem. Comm., 30, 1880/1965; and the compounds (II) in which Z is a mercapto group are known, for example, from Chem. Pharm. Bull., 12, 951/1964. Compounds of general formula (II) in which Z is a trimethylsilyloxy radical are described in Angew. Chem., 84, 347/1972.

If it is desired temporarily to block the hydroxyl groups of the ribose residue, then there can be used the protective groups conventionally employed in sugar chemistry. For this purpose, there can be used, for example, acyl groups, preferably acetyl or benzoyl radicals, or ketals, for example the 2',3'-isopropylidene compounds which, after the condensation reaction has taken place, can easily be converted into the free 2',3'-dihydroxy compounds by reaction with acids. However, when acyl radicals are used as the protective groups, they are removed under alkaline conditions.

The pharmacologically compatible salts are obtained in the usual manner by neutralization of the free bases (I) with non-toxic inorganic or organic acids, for example, with hydrochloric acid, sulfuric acid, phosphoric acid, hydrobromic acid, acetic acid, lactic acid, citric acid, oxalic acid, malic acid, salicylic acid, malonic acid or succinic acid.

The following Examples are given for the purpose of illustrating the compounds of the present invention and their preparation:

EXAMPLE 1

N(6)-cyclopentyl-N(6)-(3-isopropoxypropyl)-adenosine 13 g. triacetyl-6-chloro-9-($\beta$-D-ribofuranosyl)-purine and 14 g. N-3-isopropoxypropyl-cyclopentylamine are heated under reflux for 2 hours in 100 ml. butanol. The reaction solution is then evaporated in a vacuum, the residue is dissolved in 100 ml. methanol and, after the addition of 5 ml. 1N sodium methylate solution, heated for a few minutes on a steam-bath. After cooling, the methanol is distilled off and the remaining syrup is dissolved in chloroform. The chloroform solution is washed with water, dilute hydrochloric acid and again with water, dried, evaporated to a small volume and purified over a column of silica gel. The substance is eluted with chloroform/methanol (99:1), detection taking place thin layer chromatographically [DC finished plates silica gel "Merck"; toluene/methanol (9:1); detection UV 254 nm]. There are obtained 5.7 g. (65% of theory) N(6)-cyclopentyl-N(6)-(3-isopropoxypropyl)-adenosine which, after recrystallization from ethanol, melts at 110°–112°C.

In an analogous manner, from triacetyl-6-chloro-9-($\beta$-D-ribofuranosyl)-purine and N-2-hydroxypropylcyclohexylamine, there is obtained, in a yield of 46% of theory, N(6)-cyclohexyl-N(6)-(2-hydroxypropyl)-adenosine; m.p. 88°–90°C.

EXAMPLE 2

N(6)-cycloheptyl-N(6)-3-methoxypropyl-adenosine 2.9 g. 6-chloro-9-(β-D-ribofuranosyl)-purine, 3.3 g. N-3-methoxypropyl-cycloheptylamine and 3.3 ml. triethylamine are boiled for 24 hours in 50 ml. butanol. The solution is evaporated in a vacuum and the residue taken up in a mixture of ether, ethyl acetate and benzene. The organic phase is successively washed with dilute acetic acid, an aqueous solution of sodium bicarbonate and water. After drying with anhydrous sodium sulfate and clarification with active charcoal, the solution is evaporated in a vacuum. The residue is recrystallized from ethyl acetate. There are obtained 2.3 g. (53% of theory) N(6)-cycloheptyl-N(6)-3-methoxypropyl-adenosine; m.p. 147°–148°C.

In an analogous manner, there is obtained from 6-chloro-9-(β-D-ribofuranosyl)-purine and a. N-2-hydroxyethyl-cycloheptylamine, N(6)-cycloheptyl-N(6)-2-hydroxyethyl-adenosine, which sinters at 60°–70°C; yield 55% of theory;

b. N-3-hydroxypropyl-cycloheptylamine, N(6)-cycloheptyl-N(6)-3-hydroxypropyl-adenosine, which sinters at 75°C.; yield 30% of theory;

c. N-2-hydroxypropyl-cycloheptylamine, N(6)-cycloheptyl-N(6)-2-hydroxypropyl-adenosine, which sinters at 70°C.; yield 61% of theory; and d. N-8-hydroxyoctyl-methylamine, N(6)-methyl-N(6)-(8-hydroxyoctyl)-adenosine, which melts at 150°–152°C.; yield 85% of theory.

EXAMPLE 3

N(6)-cyclohexyl-N(6)-3-methoxypropyl-adenosine 10.8 g. triacetyl-6-chloro-9-(β-D-ribofuranosyl)-purine and 12.8 g. N-(3-methoxypropyl)-cyclohexylamine are heated under reflux for 2 hours in 100 ml. butanol. The reaction solution is evaporated in a vacuum, the residue is taken up in chloroform and the chloroform phase is washed with dilute hydrochloric acid and water for the removal of excess amine. After drying over anhydrous sodium sulfate, the chloroform is distilled off and the remaining syrup is dissolved in methanol. After the addition of 5 ml. 1N sodium methylate solution, the solution is heated for a few minutes on a steam-bath and the methanol subsequently distilled off. The residue is taken up in ethyl acetate and the solution is washed twice with water, dried over anhydrous sodium sulfate and evaporated. When the amorphous residue is mixed with ether, then there is obtained a clear, strongly colored solution from which crystallizes out N(6)-cyclohexyl-N(6)-3-methoxypropyl-adenosine in a yield of 6.9 g. (63% of theory); it has a melting point of 134°–136°C. The compound can be recrystallized from ethanol/water (about 2:1).

In an analogous manner, there is obtained from triacetyl-6-chloro-9-(β-D-ribofuranosyl)-purine and a. N-2-hydroxyethyl-cyclohexylamine, N(6)-cyclohexyl-N(6)-(2-hydroxyethyl)-adenosine, which melts at 110°–112°C.; yield 52% of theory;

b. N-methyl-trans-2-hydroxycyclohexylamine, N(6)-methyl-N(6)-(trans-2-hydroxycyclohexyl)-adenosine, which melts at 187°–188°C.; yield 38% of theory;

c. N-(3-hydroxypropyl)-cyclohexylamine, N(6)-cyclohexyl-N(6)-(3-hydroxypropyl)-adenosine, which sinters at 93°–96°C.; yield 47% of theory;

d. N-(2-hydroxyethyl)-cyclopentylamine, N(6)-cyclopentyl-N(6)-(2-hydroxyethyl)-adenosine, which melts at 169°–171°C.; yield 40% of theory; and e. N-(3-methoxypropyl)-cyclopentylamine, N(6)-cyclopentyl-N(6)-(3-methoxypropyl)-adenosine, which melts at 83°–86°C.; yield 46% of theory.

EXAMPLE 4

N(6)-cyclohexyl-N(6)-(3-isopropoxypropyl)-adenosine 5.7 g. 6-chloro-9-(β-D-ribofuranosyl)-purine and 10 g. N-(3-isopropoxypropyl)-cyclohexylamiine are heated under reflux for 2 hours in 100 ml. butanol. The solution is evaporated in a vacuum and the residue is stirred with 150 ml. hot water and the water is poured off. The remaining oil is taken up in chloroform and purified over a column of silica gel. The column is eluted with chloroform/methanol (99:1) and, after thin layer chromatographic control [DC finished plates silica gel Merck; chloroform/methanol (9:1); detection UV 254 nm], those fractions are collected which contain the pure substance. After evaporation of the solvent, there is obtained an amorphous residue which is dissolved in ether. From the ethereal solution crystallize 5.8 g. (64% of theory) N(6)-cyclohexyl-N(6)-(3-isopropoxypropyl)-adenosine, which melts at 142°–143°C.

In an analogous manner, there is obtained from 6-chloro-9-(β-D-ribofuranosyl)-purine and a. N-(3-methoxypropyl)-bicyclo[2,2,1]heptyl-2-amine, N(6)-bicyclo[2,2,1]heptyl-(2)-N(6)-(3-methoxypropyl)-adenosine, which sinters at 97°–89°C.; yield 53% of theory;

b. N-(2-methoxyethyl)-cyclohexylamine, N(6)-cyclohexyl-N(6)-(2-methoxyethyl-adenosine, which melts at 132°–133°C.; yield 57% of theory;

c. N-(2-ethoxyethyl)-cyclohexylamine, N(6)-cyclohexyl-N(6)-(2-ethoxyethyl)-adenosine, which melts at 132°–134°C.; yield 62% of theory;

d. N-(2-ethoxyethyl)-cyclopentylamine, N(6)-cyclopentyl-N(6)-(2-ethoxyethyl)-adenosine, which melts at 102°–103°C.; yield 49% of theory;

e. N-(2-isopropoxyethyl)-cyclohexylamine, N(6)-cyclohexyl-N(6)-(2-isopropoxyethyl)-adenosine, which melts at 138°–140°C.; yield 58% of theory;

f. N-(3-methoxypropyl)-2-methyl-cyclohexylamine, N(6)-(2-methyl-cyclohexyl)-N(6)-(3-methoxypropyl)-adenosine which melts at 108°–110°C.; yield 47% of theory;

g. N-(3-methoxypropyl)-3-methyl-cyclohexylamine, N(6)-(3-methylcyclohexyl)-N(6)-(3-methoxypropyl)-adenosine, which melts at 148°–150°C.; yield 54% of theory;

h. N-(3-methoxypropyl)-4-methyl-cyclohexylamine, N(6)-(4-methylcyclohexyl)-N(6)-(3-methoxypropyl)-adenosine, which melts at 118°–120°C.; yield 63% of theory;

i. N-(2-isopropoxyethyl)-cyclopentylamine, N(6)-cyclopentyl-N(6)-(2-isopropoxyethyl)-adenosine, which melts at 117°–118°C.; yield 55% of theory;

j. N-(2-methoxypropyl)-cyclohexylamine, N(6)-cyclohexyl-N(6)-(2-methoxypropyl)-adenosine, which melts at 124°–125°C.; yield 62% of theory;

k. N-(3-hydroxypropyl)-cyclopentylamine, N(6)-cyclopentyl-N(6)-(3-hydroxypropyl)-adenosine, which melts at 108°–110°C.; yield 65% of theory;

l. N-(3-ethoxypropyl)-cyclohexylamine, N(6)-cyclohexyl-N(6)-(3-ethoxypropyl)-adenosine, which melts at 112°–114°C.; yield 52% of theory;

m. N-(3-methoxypropyl)-methylamine, N(6)-methyl-N(6)-(3-methoxypropyl)-adenosine, which melts at 102°–105°C.; yield 56% of theory.

The compounds of this invention are, as indicated above, useful to decrease serum lipids in mammals. The effectiveness of the instant compounds on the lowering of triglycerides in the blood serum was determined following the procedure of Kreutz and Eggstein, modified by Schmidt et al. (Z. klin. Chem. u. klin. Biochem., 1968, 156–159). The procedure was carried out using for each compound ten healthy male Sprague-Dawley rats, each weighing about 200 g. The animals were kept without food for 16 to 18 hours before application. The compounds were administered intraperitoneally (i.p.) in an aqueous buffered solution. The control group in each instance received only the solvent in the same manner of application. One hour after application of the compounds (or of the solvent alone for establishing the control values) the animals were killed and exsanguinated and in the obtained serum thereof the triglycerides determined enzymatically according to the method of Kreutz and Eggstein, modified by Schmidt et al, supra.

The results are set forth in the following Table 1, expressed as percentage reduction of the triglycerides in the serum of treated animals relative to the control animals.

side effects have been observed to occur as a result of their administration.

In accordance with the method of treatment of the present invention, the compounds can be given via the oral route. However, the compounds can also be administered as parenterals in the form of their solutions or suspensions. The compounds can be administered either alone and/or preferably in combination with a pharmaceutically acceptable carrier, and such administration can be carried out in both single and multiple dosages. More particularly, the compounds of this invention can be administered in a wide variety of different dosage forms wherein they are combined with various pharmaceutically acceptable inert carriers in the form of tablets, capsules, dragees, powders, aqueous suspensions, solutions, and the like. Such carriers include solid diluents or fillers, liquid aqueous media and various non-toxic organic solvents, etc. In general, the therapeutically effective compounds are present in such dosage forms at concentration levels ranging from about 0.01 to about 90% by weight of the total composition, i.e., in amounts which are sufficient to provide the desired unit dosage.

In dosage unit form, the compounds as set out herein are used in amounts of from 0.1 to 50 mg. active ingredient per dosage unit. Preferably, the compositions are compounded so that for parenteral administration, 0.5–5 mg. active compound/dosage unit is present and for oral administration 2–10 mg. of compound/dosage unit.

The present invention also includes pharmaceutical compositions in all the conventional forms for oral and parenteral administration, for example, tablets, cap- Table 1

| Test Compound | Dosage (mg/kg) | Depression of Triglycerides (in %) |
| --- | --- | --- |
| Nicotinic acid | 10 | 28 |
| N(6)-cyclohexyl-N(6)-(2-hydroxypropyl)-adenosine | 0.050 | 32 |
| N(6)-cyclohexyl-N(6)-(3-methoxypropyl)-adenosine | 0.100 | 43 |
| N(6)-cyclohexyl-N(6)-(2-hydroxyethyl)-adenosine | 0.100 | 27 |
| N(6)-cyclohexyl-N(6)-(3-hydroxypropyl)-adenosine | 0.050 | 42 |
| N(6)-cyclopentyl-N(6)-(3-methoxypropyl)-adenosine | 0.100 | 60 |
| N(6)-cyclohexyl-N(6)-(3-isopropoxypropyl)-adenosine | 0.050 | 50 |
| N(6)-cyclopentyl-N(6)-(2-ethoxyethyl)-adenosine | 0.050 | 45 |
| N(6)-cyclopentyl-N(6)-(2-isopropoxyethyl)-adenosine | 0.050 | 20 |
| N(6)-cyclopentyl-N(6)-(3-hydroxypropyl)-adenosine | 0.050 | 32 |
| N(6)-cyclohexyl-N(6)-(3-ethoxypropyl)-adenosine | 0.050 | 53 |
| N(6)-cycloheptyl-N(6)-3-methoxypropyl-adenosine | 0.050 | 25 |

The data in Table 1 show that whereas 10 mg/kg of nicotinic acid produces a 28% reduction in triglycerides, substantially lower dosages of the new compounds produce the same or even greater reductions in triglycerides.

As previously indicated, the adenosine derivatives of this invention are readily adapted to therapeutic use as fat-affecting agents. The toxicity of the compounds of the invention has been found to be quite low or substantially non-existent when they are administered in amounts that are sufficient to achieve the desired therapeutic effect. Moreover, no other pharmacological sules, dragees, syrups, solutions, suspensions, drops, suppositories, and the like. For this purpose, the active material is mixed with a solid or liquid pharmaceutical carrier or diluent and the mixture subsequently brought into the desired form. Examples of solid materials include lactose, mannitol, starch, talc, methyl-cellulose, silicic acid, calcium phosphate, magnesium stearate, agar-agar and gelatine to which, if desired, coloring and/or flavoring materials can be added. Liquid carrier materials must be sterile when used for injection solutions and are preferably placed into ampules.

The precise dosages of compounds to be administered to a given patient will depend on a number of factors, but generally a dosage in the range of 0.01 to 20 mg/kg per day will result in efficacious effects both by the oral and parenteral route, preferably of 0.5 to 5 mg/kg per day.

It will be understood that the specification and examples are illustrative but not limitative of the present invention and that other embodiments within the spirit and scope of the invention will suggest themselves to those skilled in the art.

What is claimed is:

1. An N(6)-disubstituted adenosine compound of the formula

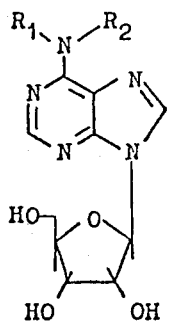

wherein
R$_1$ is hydroxy- or C$_{1-4}$-alkoxy-substituted-alkyl of 1 to 8 carbon atoms, or hydroxy- or C$_{1-4}$-alkoxy-substituted cycloalkyl of 5-10 carbon atoms, and
R$_2$ is cycloalkyl or bicycloalkyl of 5 to 10 carbon atoms, or cycloalkyl or bicycloalkyl of 5 to 10 carbon atoms substituted by alkyl of 1 to 8 carbon atoms,
or a pharmacologically compatible salt thereof.

2. A compound as claimed in claim 1 wherein the compound is N(6)-cyclohexyl-N(6)-(3-hydroxypropyl)-adenosine or a pharmacologically compatible salt thereof.

3. A compound as claimed in claim 1 wherein the compound is N(6)-cyclohexyl-N(6)-(3-isopropoxypropyl)-adenosine or a pharmacologically compatible salt thereof.

4. A compound as claimed in claim 1 wherein the compound is N(6)-cyclopentyl-N(6)-(2-ethoxyethyl)-adenosine or a pharmacologically compatible salt thereof.

5. A compound as claimed in claim 1 wherein the compound is N(6)-cyclohexyl-N(6)-(3-ethoxypropyl)-adenosine or a pharmacologically compatible salt thereof.

* * * * *